United States Patent
Yoshizawa et al.

(10) Patent No.: US 10,757,224 B2
(45) Date of Patent: Aug. 25, 2020

(54) DATA PROCESSING SYSTEM, DATA PROCESSING METHOD, AND PRINTER

(71) Applicant: Seiko Epson Corporation, Tokyo (JP)

(72) Inventors: Junichi Yoshizawa, Matsumoto (JP); Koichiro Tsutsumi, London (GB); Kazunori Chihara, Matsumoto (JP); Takashi Kawamori, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 257 days.

(21) Appl. No.: 15/329,198

(22) PCT Filed: Sep. 2, 2015

(86) PCT No.: PCT/JP2015/004469
§ 371 (c)(1),
(2) Date: Jan. 25, 2017

(87) PCT Pub. No.: WO2016/035341
PCT Pub. Date: Mar. 10, 2016

(65) Prior Publication Data
US 2017/0214769 A1  Jul. 27, 2017

(30) Foreign Application Priority Data
Sep. 4, 2014  (JP) .................................. 2014-180377

(51) Int. Cl.
*H04L 29/06* (2006.01)
*G06F 13/00* (2006.01)
(Continued)

(52) U.S. Cl.
CPC ............ *H04L 67/42* (2013.01); *G06F 9/5083* (2013.01); *G06F 9/54* (2013.01); *G06F 11/2041* (2013.01);
(Continued)

(58) Field of Classification Search
CPC .. G06Q 20/20; G06Q 30/0238; G06Q 20/202; G06Q 20/325; G06Q 30/0268;
(Continued)

(56) References Cited

U.S. PATENT DOCUMENTS 6,363,354 B1    3/2002  Watanabe
2001/0016871 A1  8/2001  Fujita
(Continued)

FOREIGN PATENT DOCUMENTS

EP    1 376 361 A1    1/2004
JP    2000-076549 A   3/2000
(Continued)

OTHER PUBLICATIONS

International Search Report for Application No. PCT/JP2015/004469, dated Nov. 17, 2015 (3 pages).

*Primary Examiner* — Chris Parry
*Assistant Examiner* — Weiwei Y Stiltner
(74) *Attorney, Agent, or Firm* — Workman Nydegger

(57) ABSTRACT

A system in which a terminal device communicates with a server and processes data enables the terminal device to continue processing data even when a communication fault occurs.

A data processing system includes a server that stores a POS application; a processing device that stores a POS application; and a tablet that connects to the server and executes the POS application through a web browser when a terminal communication path satisfies a terminal communication condition, and when a terminal communication path does not satisfy the terminal communication condition, connects to the processing device through a process communication path based on information indicated by the POS application.

16 Claims, 6 Drawing Sheets

(51) Int. Cl.
- *G06F 9/54* (2006.01)
- *G06F 11/20* (2006.01)
- *G06Q 30/02* (2012.01)
- *G06Q 20/20* (2012.01)
- *G06F 9/50* (2006.01)
- *H04L 12/26* (2006.01)
- *H04L 29/08* (2006.01)

(52) U.S. Cl.
CPC ............ *G06F 13/00* (2013.01); *G06Q 20/20* (2013.01); *G06Q 20/201* (2013.01); *G06Q 20/209* (2013.01); *G06Q 30/0236* (2013.01); *G06Q 30/0238* (2013.01); *H04L 43/0811* (2013.01); *H04L 67/02* (2013.01); *H04L 67/34* (2013.01)

(58) Field of Classification Search
CPC .... G06Q 20/201; G06Q 20/209; H04L 67/42; H04L 43/0811; H04L 67/02; H04L 67/34; G06F 13/00; G06F 9/54; G06F 11/2041; G06F 9/5083; G06F 9/50
USPC .......................... 709/203; 705/16, 20, 21, 24
See application file for complete search history.

(56) References Cited

U.S. PATENT DOCUMENTS

| | | | |
|---|---|---|---|
| 2002/0042822 A1 | 4/2002 | Tillmanns | |
| 2011/0047413 A1* | 2/2011 | McGill | G06F 11/1662 714/15 |
| 2013/0159191 A1* | 6/2013 | Maiya | G06Q 40/02 705/44 |
| 2014/0249941 A1* | 9/2014 | Hicks | G06K 7/10821 705/17 |
| 2015/0074765 A1* | 3/2015 | Haight | H04L 63/083 726/4 |
| 2015/0206116 A1* | 7/2015 | Bess | G06Q 30/06 705/21 |

FOREIGN PATENT DOCUMENTS

| | | |
|---|---|---|
| JP | 2003-006018 | 1/2003 |
| JP | 2007-511807 | 5/2007 |
| JP | 2013-137666 A | 7/2013 |
| JP | 2014-149602 | 8/2014 |
| WO | 2005-017750 | 2/2005 |

\* cited by examiner

DATA PROCESSING SYSTEM, DATA PROCESSING METHOD, AND PRINTER

Priority is claimed under 35 U.S.C. § 119 to Japanese Application No. 2014-180377 filed on Sep. 4, 2014, and under 35 U.S.C. § 365 to PCT/JP2015/004469 filed on Sep. 2, 2015.

TECHNICAL FIELD

The present invention relates to a data processing system, a data processing method, and a printer.

BACKGROUND

Systems in which a terminal device connected to a server uses functions provided by the server to process data are known from the literature (see, for example, PTL 1). A problem with such systems is that the system stops working if the communication path connecting the server and the terminal device is interrupted. To handle this problem, the POS (point-of-sale) system described in PTL 1, for example, has an auxiliary server device with a line confirmation device between the server and the client. The system in PTL 1 connects the auxiliary server device and the server through two or more Internet connections, and when communication through one Internet connection cannot be confirmed, the client and server communicate through another Internet connection.

CITATION LIST

Patent Literature

[PTL 1] JP-A-2013-137666

SUMMARY

A device for monitoring the communication state of each communication line is required when redundant communication lines are used to handle communication problems. For example, in the system in PTL 1, the auxiliary server connected to two or more Internet connections relays communication between the client and server, and monitors whether or not communication over the Internet connections can be confirmed. Because this complicates the system configuration, implementing such a solution is not simple.

With consideration for the foregoing, an objective of the present invention is to enable a terminal device to process data even when a communication problem occurs in a system in which the terminal device communicates with a server to process data.

Solution to Problem

To achieve the foregoing objective, a data processing system according to at least one embodiment of the invention comprises a server configured to store server-side master data and server-side software; a processing device configured to store processor-side master data and processor-side software; and a terminal device configured to connect to the server through a terminal communication path and execute the server-side software through a web browser when the terminal communication path satisfies a previously set terminal communication condition, and when the terminal communication path does not satisfy the terminal communication condition, connect to the processing device through a process communication path based on information specified in the server-side software, and execute the processor-side software through the web browser.

When the communication state of a terminal communication path that connects a terminal device to a server does not meet the condition, this configuration enables the terminal device to connect to the processing device to continue processing without interruption.

In the data processing system of at least one embodiment of the invention, if the terminal communication path satisfies the terminal communication condition while the terminal device is connected to the processing device and executing one process through the process communication path, the terminal device changes the connection to the terminal communication path when executing the one process in progress ends.

When the communication state of the terminal communication path returns to the state meeting the condition, this configuration enables the terminal device to change the connection and connect to the server without adversely affecting the process being executed.

In the data processing system of at least one embodiment of the invention, when the terminal communication path satisfies the terminal communication condition, the terminal device connects to the server through the terminal communication path, executes a process based on the server-side master data, and sends process information related to the executed process to the server.

This configuration enables storing on the server information related to a process executed by the terminal device.

In the data processing system of at least one embodiment of the invention, when the terminal communication path does not satisfy the terminal communication condition, the terminal device connects to the processing device through the process communication path, executes a process based on the processor-side master data, and sends process information related to the executed process to the processing device.

When the communication state of the terminal communication path for connecting the terminal device to the server does not meet the condition, this configuration enables the terminal device to execute a process based on data provided by the processing device, and save information related to the executed process on the processing device.

In the data processing system of at least one embodiment of the invention, when the server communication path satisfies a previously set server communication condition, the processing device updates at least one of the processor-side master data and the processor-side software based on at least one of the server-side master data and the server-side software.

This configuration can synchronize data and software stored on a processing device with data and software stored on a server.

In the data processing system of at least one embodiment of the invention, when the server communication path satisfies a previously set server communication condition, the processing device sends the process information from the terminal device to the server.

When the communication state of the terminal communication path for connecting the terminal device to the server does not meet the condition, this configuration enables sending information related to the process executed by the terminal device to the server.

In the data processing system of at least one embodiment of the invention, the processing device has a process information storage unit, and when the server communication path does not satisfy the server communication condition, stores the process information from the terminal device in the process information storage unit, and updates the processor-side master data based on the process information stored in the process information storage unit.

When the communication state of the terminal communication path for connecting the terminal device to the server does not meet the condition, this configuration enables the terminal device to execute a process and update data stored by the processing device based on information related to the executed process.

In the data processing system of at least one embodiment of the invention, when the server communication path satisfies the server communication condition, the processing device connects to the server, executes a process based on the server-side master data, and sends process information related to the executed process to the server, through the server communication path.

This configuration enables the terminal device to execute a process based on data stored on the server, and update data stored on the server based on information related to the executed process.

In the data processing system of at least one embodiment of the invention, the processing device has a data storage unit configured to store the processor-side master data, and when the server communication path does not satisfy the server communication condition, executes the process based on the processor-side master data in the data storage unit, and stores the process information related to the executed process in the process information storage unit.

When the communication state of the server communication path for connecting the processing device to the server does not satisfy the condition, this configuration enables the processing device to execute a process based on data stored by the processing device, and store information related to the executed process in a storage unit of the processing device.

In the data processing system of at least one embodiment of the invention, when the server communication path changes from a state not satisfying the server communication condition to a state satisfying the server communication condition, the processing device sends the process information stored in the process information storage unit to the server.

When the communication state of the server communication path is restored to the state meeting the condition, this configuration can send information related to the process executed by the terminal device or the processing device to the server.

In the data processing system of at least one embodiment of the invention, the processing device has a software storage unit configured to store the processor-side software, connects to the server and executes the server-side software through the server communication path when the server communication path satisfies the server communication condition, and when the server communication path does not satisfy the server communication condition, executes the processor-side software from the software storage unit.

This configuration enables the processing device to execute processes regardless of the communication state of the server communication path.

To achieve the foregoing objective, another aspect of the invention is a data processing method characterized by a terminal device configured to connect to a server and a processing device: connecting to the server through a terminal communication path and executing server-side software of the server through a web browser when the terminal communication path satisfies a previously set terminal communication condition; and connecting to the processing device through a process communication path based on information specified in the server-side software, and executing processor-side software of the processing device through the web browser when the terminal communication path does not satisfy the terminal communication condition.

When the communication state of a terminal communication path that connects a terminal device to a server does not meet the condition, this configuration enables the terminal device to connect to the processing device to continue processing without interruption.

To achieve the foregoing objective, another aspect of the invention is a terminal device connecting to the server through a terminal communication path and executing server-side software of the server through a web browser when the terminal communication path satisfies a previously set terminal communication condition; and connecting to a processing device through a process communication path based on information specified in the server-side software, and executing processor-side software of the processing device through the web browser when the terminal communication path does not satisfy the terminal communication condition.

When the communication state of a terminal communication path that connects a terminal device to a server does not meet the condition, this configuration enables the terminal device to connect to the processing device to continue processing without interruption.

When the communication state of a terminal communication path that connects a terminal device to a server does not satisfy a specific condition, the terminal device of at least one embodiment of the invention connects to the processing device and executes a process through a process communication path, and can continue executing a process without interruption.

DESCRIPTION OF EMBODIMENTS

Embodiments of the invention are described below with reference to the accompanying figures.

Figure 1:
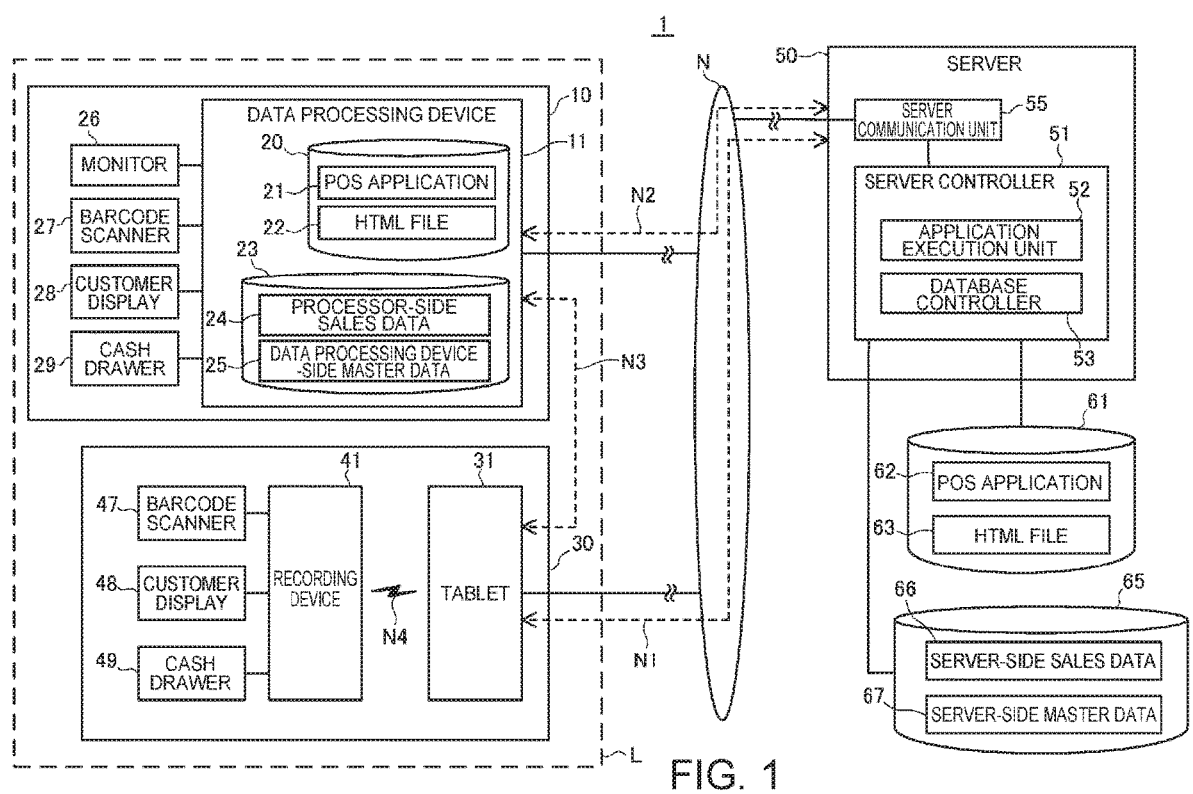
FIG. 1 is a block diagram illustrating the configuration of a data processing system according to an embodiment of the invention.

FIG. 1 is a block diagram illustrating the configuration of a data processing system 1 according to this embodiment of the invention, and in particular illustrates the configuration of the server 50.

The data processing system 1 in this embodiment of the invention functions as a POS (point-of-sales) system for executing a sales transaction process in a store L where product sales transactions are made. A store L in which the data processing system 1 is deployed is a business that sells products (including services) and receives payment therefor, and the data processing system 1 executes a transaction process for calculating the payment amount and receiving payment, and stores information related to the sales transaction process.

The data processing system 1 includes a POS device 10 and a POS device 30, and the POS devices 10, 30 connect to a server 50 through a communication network N.

The data processing system 1 is a WebPOS system in which a data processing device 11 and tablet 31 embody the function of a POS device by running by means of respective web browsers a POS application 62 (web application) that is provided by the server 50.

The POS device 10 includes a data processing device 11, and a monitor 26, barcode scanner 27, customer display 28, and cash drawer 29 that are connected to the data processing device 11. The data processing device 11 connects to the server 50 through a communication network N, and exchanges data with the server 50.

The POS device 30 includes a tablet 31 (terminal device), recording device 41, barcode scanner 47, customer display 48, and cash drawer 49. The tablet 31 is a so-called tablet computer having a flat body. The tablet 31 connects through the communication network N to the server 50, and exchanges data with the server 50.

The configuration of the POS device 10 and POS device 30 are described further below.

The communication network N may be embodied by various communication lines or combinations thereof, including a public telecommunication line, a dedicated line, or a wireless communication line including a cellular telephone line, and the backbone communication lines of these communication lines, and is not limited to a specific configuration. The communication network N could be a wide-area communication network connecting remote locations, but the scale and range of the communication network N is not specifically limited. The communication network N may also include server devices, gateway devices, routers, and other network devices for connecting different types of communication lines. The communication network N may also comprise multiple communication lines.

The communication path through which POS device 30 communicates with the server 50 is terminal communication path N1, and the communication path through which POS device 10 communicates with the server 50 is server communication path N2. Terminal communication path N1 and server communication path N2 refer to virtual or logical communication lines (paths, channels) over the communication lines. Terminal communication path N1 and server communication path N2 may be formed on the same physical communication paths or on physically separate communication paths.

This embodiment of the invention uses the example of a configuration having a communication device 5 described below in a store L with the communication device 5 connected to the communication network N. In this configuration, the data processing device 11 of POS device 10 and the tablet 31 of POS device 30 connect through the communication device 5 to the communication network N. The terminal communication path N1 and server communication path N2 are therefore on a shared communication line between at least the communication device 5 and the communication network N, but are logically independent communication paths. For example, a configuration in which the data processing device 11 and tablet 31 connect to the communication network N through separate communication devices is obviously possible.

The data processing system 1 has a function for determining if communication over the communication lines is possible. More specifically, the POS device 30 determines whether or not communication over the terminal communication path N1 is possible, and the POS device 10 determines whether or not communication over the server communication path N2 is possible.

More specifically, the tablet 31 has a terminal communication condition, which is a condition for determining if communication over the terminal communication path N1 is possible. The terminal communication condition may be applied to the tablet 31 by an appropriate method, such as being previously set on the tablet 31, generated by the tablet 31, or acquired by the tablet 31 from another device. The data processing device 11 has a server communication condition, which is a condition for determining if communication over the server communication path N2 is possible. The server communication condition may be applied to the data processing device 11 by a desirable method, such as being previously set on the data processing device 11, generated by the data processing device 11, or acquired by the data processing device 11 from another device. The terminal communication condition includes data that is the standard or reference for determining if the communication state of the terminal communication path N1 is a state enabling communication. The server communication condition includes data that is the standard or reference for determining if the communication state of the server communication path N2 is a state enabling communication. Specific examples of this data in the terminal communication condition include the packet loss, propagation delay, signal-to-noise ratio, and error correction conditions. The terminal communication condition and/or server communication condition may be sent by the server 50 to the tablet 31 and/or data processing device 11.

The server 50 includes a server controller 51 and a server communication unit 55 (a server communicator 55). The server controller 51 includes an application execution unit 52 (an application executor 52) and a database controller 53. A data storage unit 61 (a data storage 61), and a database 65, are also connected to the server 50.

The server communication unit 55 connects to the communication network N, and sends and receives data with POS device 10 and with POS device 30 as controlled by the server controller 51.

The server controller 51 comprises CPU, ROM, RAM, and other peripheral circuits, and controls parts of the server 50 by the CPU executing a program. The application execution unit 52 and database controller 53 are software functions instantiated by the CPU of the server controller 51 running a program.

The data storage unit 61 stores a POS application 62 (server-side software) that is executed by the application execution unit 52, and an HTML (HyperText Markup Language) file 63 that is sent to the POS devices 10, 30.

The database 65 stores server-side sales data 66 and server-side master data 67. The database 65 stores the results of transaction processes for product transactions executed by the POS devices 10, 30 in the server-side sales data 66. In other words, the server-side sales data 66 contains data about the results of transaction processes processed by the data processing system 1. The data contained in the server-side sales data 66 includes, for example, the date and time of the transaction process, the name of the store L, identification information (ID) for the POS devices 10, 30 that executed the transaction process, and the name, quantity, and price of each product in the transaction process, the total amount of the transaction process, and the method of payment. When payment is by cash, the amount received from the customer and the amount of change may also be included. The server-side sales data 66 may also include information about the customer, which is the other party to the transaction.

The server-side master data 67 accumulates data used in the transaction process. For example, it may include a PLU (Price Look Up) database containing the prices of products corresponding to the product identification information. The product identification information is so-called PLU data, that is, data represented by the product barcode that is read by the barcode scanner 27, 47. The server-side master data 67 may also include data related to the sales conditions for a product.

The server controller 51 calls the application execution unit 52 when triggered by the server communication unit 55 receiving an access request sent by the data processing device 11 or an access request sent by the tablet 31. The application execution unit 52 runs the POS application 62, and sends the HTML file 63 stored by the data storage unit 61 to the data processing device 11 or tablet 31.

The HTML file 63 is a file the server controller 51 sends to the data processing device 11 and tablet 31, and includes image data and text data for display by the data processing device 11 and tablet 31, and data defining the display format. The HTML file 63 includes a script for calling functions of the server 50. This script may be written in Java (R), for example.

The data processing device 11 and tablet 31 process the HTML file 63 by a plug-in as described further below, and send data to the server 50 and process data transmitted by the server 50 through script functions.

Web browsers on the data processing device 11 and tablet 31 execute scripts to send PLU data to the server 50 and request data from the server-side master data 67. When the application execution unit 52 receives PLU data from the data processing device 11 or tablet 31, it extracts and sends the price data corresponding to the PLU data from the server-side master data 67 to the data processing device 11 or tablet 31. This price data includes the unit price, product name, and product category, or other information.

The data processing device 11 or tablet 31 transmits the result of the transaction process executed by functions of the POS application 62, and when the server communication unit 55 receives this process result, the application execution unit 52 updates the server-side sales data 66 based on the received process result.

Figure 2:
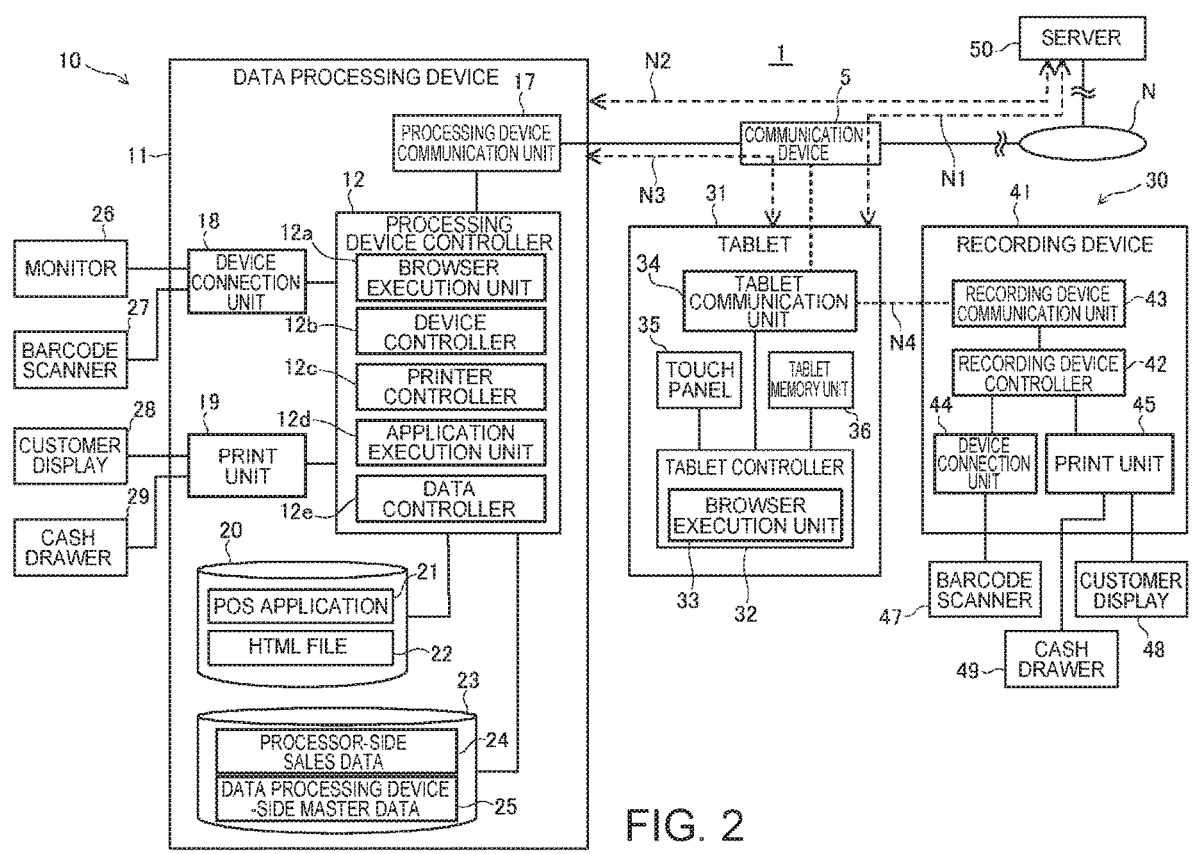
FIG. 2 is a block diagram illustrating the configuration of the data processing system.

FIG. 2 is a block diagram illustrating the configuration of a data processing system 1, and particularly the configuration of the POS device 10 and POS device 30, according to this embodiment.

As shown in FIG. 2, the communication device 5 is disposed in a store L where the POS devices 10, 30 are deployed. The communication device 5 is a device for connecting a wide area network and the local network inside the store L, and may be a switch, router, or gateway server, for example. The wide area network side of the communication device 5 connects to the communication network N through a wired communication line or a cell phone or other type of wireless communication line. The interface on the LAN side of the communication device 5 may include a wired LAN interface such as an Ethernet (R) interface, a wireless LAN interface such as IEEE 802.1, or Bluetooth (R) interface. In this embodiment of the invention, the data processing device 11 connects to a wired LAN interface of the communication device 5, and the tablet 31 connects to a wireless LAN interface. The communication device 5 relays communication between the data processing device 11 and server 50, and between the tablet 31 and server 50.

The communication device 5 has a function for relaying communications between devices connected on the LAN side, and more specifically enables data communication between the data processing device 11 and tablet 31 through the communication device 5. The communication path for communication between the data processing device 11 and tablet 31 is referred to below as process communication path N3. The process communication path N3 is a virtual or logical communication path (path, channel) disposed to the LAN inside the store L. The process communication path N3 may be configured in all or part using the same physical communication line as part of the terminal communication path N1 and server communication path N2, or configured on physically different communication lines.

The tablet 31 includes a tablet controller 32 that controls parts of the tablet 31 and the recording device 41, a tablet communication unit 34 (a tablet communicator 34), a touch panel 35, and a tablet memory unit 36 (a tablet memory 36).

The recording device 41 is a printer that prints a receipt with the print unit 45 as controlled by the tablet 31. The recording device 41 includes a recording device controller 42, recording device communication unit 43 (recording device communicator 43), device connection unit 44 (device connector 44), and print unit 45 (print mechanism 45). The barcode scanner 47 connects to the device connection unit 44, and the customer display 48 and cash drawer 49 connect to the print unit 45.

The tablet 31 comprises a display panel disposed on the front of a flat body, and a touch panel 35 including a touch sensor disposed over the display panel. The display panel is an LCD panel or OLED panel. The touch sensor of the touch panel 35 is a capacitive or pressure sensitive sensor, detects touch operations with the user's finger or pen-like operating device (not shown in the figure), and outputs operating data denoting the detected position to the tablet controller 32.

A web browser program is installed on the tablet 31, and the tablet controller 32 reads and runs the web browser program stored in the tablet memory unit 36. The browser execution unit 33 (browser executor 33) sends a request to a previously set server address (URL), and requests the server 50 to send an HTML file. Operation of the browser execution unit 33 is described further below.

The tablet memory unit 36 nonvolatilely stores programs executed by the tablet controller 32, and data processed by the tablet controller 32. The tablet memory unit 36 stores, for example, configuration data related to operation of the browser execution unit 33, and configuration data used by the tablet controller 32 to control parts of the recording device 41.

The tablet communication unit 34 connects to the communication device 5 and handles data communication through the communication device 5 as controlled by the tablet controller 32. The tablet communication unit 34 in this embodiment of the invention has a wireless LAN interface, and handles wireless data communication with the communication device 5.

The tablet communication unit 34 handles data communication with the recording device communication unit 43. The recording device communication unit 43 has a wireless LAN interface or a near-field communication interface such as Bluetooth (R) or Wireless USB. The tablet communication unit 34 also has a wireless communication interface for communicating with the recording device communication unit 43. The tablet communication unit 34 may communicate, for example, directly with the recording device communication unit 43, or through a network connection relayed through the communication device 5, in a wireless ad hoc mode. The communication path connecting the tablet communication unit 34 and recording device communication unit 43 is referred to below as the wireless communication link N4. The recording device controller 42 of the recording device 41 connects through the wireless communication link N4 to the tablet controller 32, and the tablet controller 32 controls parts of the recording device 41.

The recording device controller 42 controls the recording device communication unit 43 for data communication with the tablet 31. A device connection unit 44 and print unit 45 also connect to the recording device controller 42.

The device connection unit 44 has different types of connectors, such as USB connectors and monitor connectors, and interface circuits compatible with the connectors, and can connect to different types of devices. The barcode scanner 47 reads barcodes from product packaging or barcode sheets, and outputs the read result to the device connection unit 44. The barcode scanner 47 may be desirably configured to optically read codes and output the read result, and is not limited to a specific type of code. For example, the barcode scanner 47 may also read QR codes (R) and other types of 2D symbol codes.

The device connection unit 44 generates PLU data based on the read result output by the barcode scanner 47 and outputs to the recording device controller 42.

The print unit 45 includes mechanisms for recording on roll paper, including a conveyance mechanism for conveying roll paper stored inside the recording device 41, a recording mechanism for recording images on the roll paper with a thermal head, and a cutter mechanism for cutting the roll paper at a specific position. The print unit 45 conveys the roll paper by the conveyance mechanism, records receipt images on the roll paper with the recording mechanism, and cuts the roll paper with the cutter mechanism to produce a receipt as controlled by the recording device controller 42.

The print unit 45 has multiple serial interfaces for serially connecting to external devices, and a customer display 48 and cash drawer 49 are connected to these serial interfaces. The print unit 45 passes control signals output from the recording device controller 42 to the serial interfaces. The customer display 48 and cash drawer 49 are therefore daisy chained to the recording device controller 42 through the print unit 45.

The customer display 48 displays text, symbols, and images, for example, based on control signals input from the print unit 45. The cash drawer 49 has a tray for holding money, and a mechanism for locking the tray, and unlocks and opens the tray according to a drawer kick signal input from the print unit 45. When the print unit 45 passes control signals output by the recording device controller 42, the customer display 48 and cash drawer 49 operate according to the received control signals.

When the server controller 51 reads a barcode and the device connection unit 44 outputs PLU data, the recording device controller 42 sends the PLU data to the tablet controller 32. When the tablet controller 32 outputs numbers or other display data for displaying on the customer display 48, the recording device controller 42 generates and passes display signals based on the display data through the print unit 45 to the customer display 48. When the tablet controller 32 outputs a command to open the cash drawer 49, the recording device controller 42 generates and outputs a drive signal for the cash drawer 49 to the print unit 45. When the tablet controller 32 outputs a command to produce a receipt, and text data and image data for recording on a receipt, the recording device controller 42 controls driving the print unit 45 to produce a receipt.

Figure 3:
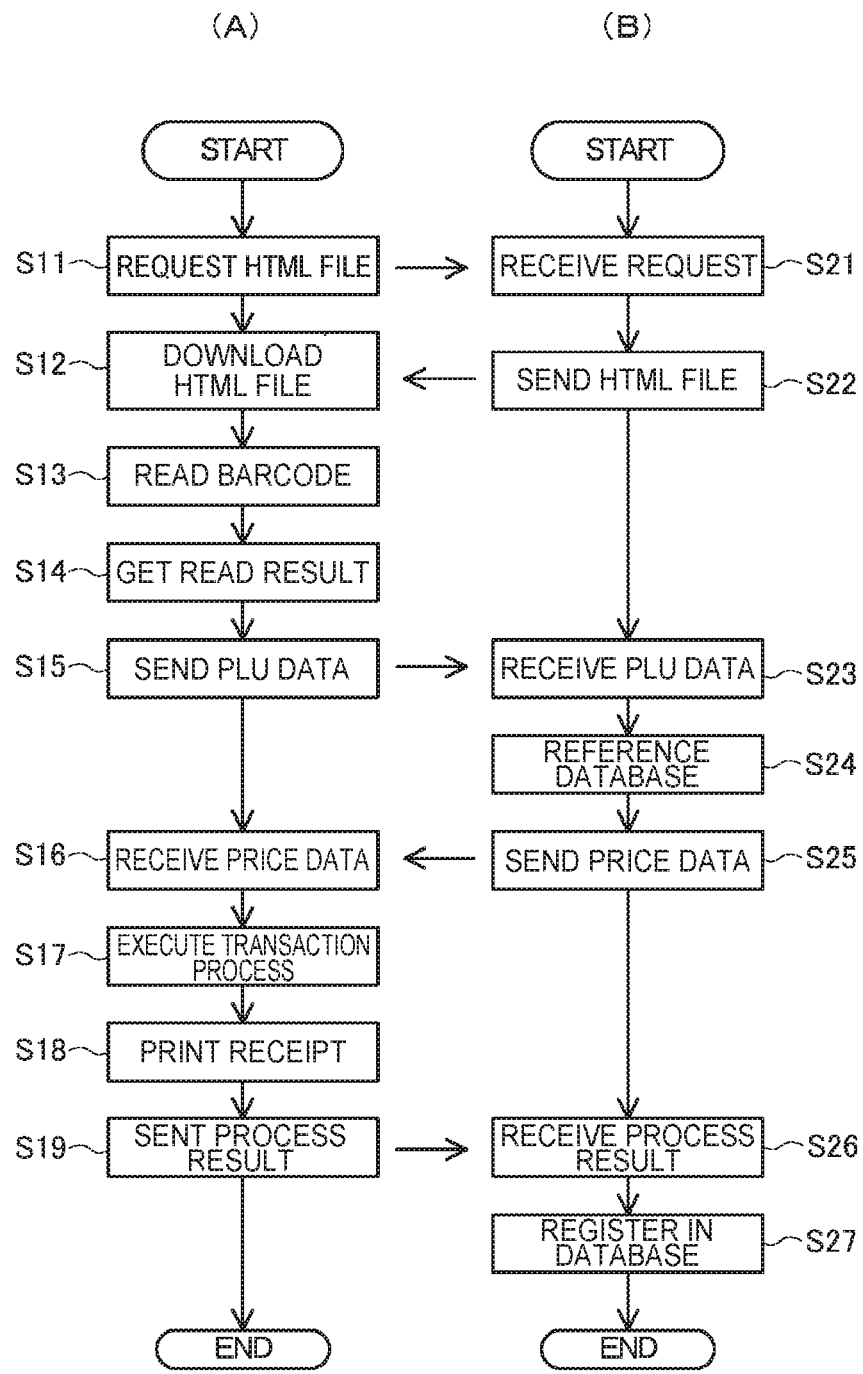
FIG. 3 is a flow chart illustrating the operation of the data processing system.

FIG. 3 is a flow chart of the operation of the data processing system 1. Column (A) of FIG. 3 shows the operation of the POS devices 10, 30 operating as POS terminals, and column (B) of FIG. 3 shows the operation of the server 50.

As described above, the browser execution unit 33 of the POS device 30 requests the server 50 to return the HTML file 63 based on the previously set access data (step S11). The application execution unit 52 of the server 50 receives the request for transmission of the HTML file 63 (step S21), and sends the HTML file 63 (step S22).

The browser execution unit 33 downloads and runs the HTML file 63 sent by the server 50 (step S12), and executes a web application with POS functionality.

The operator of the POS device 30 then uses the barcode scanner 47 to read the barcode of the product to be purchased (step S13). The device connection unit 44 gets the read result output by the barcode scanner 47 (step S14), and generates and outputs PLU data to the browser execution unit 33. The browser execution unit 33 then sends the PLU data to the server 50 (step S15).

The application execution unit 52 receives the PLU data the POS device 30 sent (step S23), and based on the received PLU data references the server-side master data 67 (step S24). The application execution unit 52 gets the price data for the received PLU data from the server-side master data 67 and sends the price data to the POS device 30 (step S25).

The browser execution unit 33 receives the price data the server 50 sent (step S16), and executes a transaction process based on the received price data (step S17). More specifically, it displays the product name, price, and product category, for example, corresponding to the PLU data read by the barcode scanner 47 on the touch panel 35. Product quantities and the payment amount received are input by operating the touch panel 35, and the browser execution unit 33 acquires the input data, calculates the purchase total by a function of a web application, and displays the transaction total and the amount received on the touch panel 35. The browser execution unit 33 also sends a command to open the cash drawer 49 as required.

When multiple products are processed in a single transaction process, the data processing system 1 repeatedly executes steps S13 to S17 in column (A) of FIG. 3, and steps S22 to S25 in column (B) of FIG. 3.

The browser execution unit 33 outputs a command to produce a receipt, text data, and image data to the recording device 41, and produces a receipt (step S18). When producing the receipt is completed, and the touch panel 35 is operated to complete the transaction or the cash drawer 49 is closed after the receipt is produced, the browser execution unit 33 determines that one transaction process was completed. When a transaction process is completed, the browser execution unit 33 sends the process result (process information) indicating the result of the transaction process to the server 50 (step S19). The browser execution unit 33 may send the process results for multiple transaction processes to the server 50 in a single batch transmission.

The application execution unit 52 then receives the process result sent by the POS device 30 (step S26), stores the process result in the server-side sales data 66 of the database 65, and updates the server-side sales data 66 (step S27).

The POS device 30 thus executes a transaction process at the POS according to operator commands, and the result of the transaction process is reflected in the server-side sales data 66.

The data processing device 11 is a printer for printing receipts with the print unit 19 (print mechanism 19), and has functions for processing data based on data stored in an auxiliary storage unit 20 (an auxiliary storage 20) (software memory unit) and a data storage unit 23 (a data storage 23) (process information storage unit).

The data processing device 11 has a processing device controller 12 that controls printing by the print unit 19 and data processing. The processing device controller 12 connects to a processing device communication unit 17 (a processing device communicator 17), device connection unit 18 (device connector 18), print unit 19, the auxiliary storage unit 20, and the data storage unit 23. Of the devices of the POS device 10, the monitor 26 and barcode scanner 27 connect to the device connection unit 18, and the customer display 28 and cash drawer 29 connect to the print unit 19.

The processing device communication unit 17 connects to the communication device 5 through a wired LAN interface, for example. The processing device communication unit 17 exchanges data with the server 50 as controlled by the processing device controller 12. The processing device communication unit 17 also communicates with the tablet 31 through the communication device 5. Note that the processing device communication unit 17 has a wireless LAN interface, and may be configured to connect wirelessly to the communication device 5, or the processing device communication unit 17 may be configured to connect wirelessly directly to the tablet communication unit 34 of the tablet 31.

The device connection unit 18 has different types of connectors, such as USB connectors and monitor connectors, and interface circuits compatible with the connectors, and can connect to different types of devices.

The monitor 26 has an LCD panel or OLED panel display screen, and displays images based on display signals input from the device connection unit 18. The device connection unit 18 outputs display signals to the monitor 26 as controlled by the processing device controller 12.

The barcode scanner 27 reads barcodes from product packaging or barcode sheets, and outputs the read result to the device connection unit 18. To register a product for sale, the operator of the POS device 10 reads the barcode of the product with the barcode scanner 27. The barcode scanner 27 may be configured identically to the barcode scanner 47. The device connection unit 18 acquires the PLU data output by the barcode scanner 27, and outputs to the processing device controller 12.

The print unit 19 has mechanisms for recording on roll paper, including a conveyance mechanism for conveying roll paper stored inside the data processing device 11, a recording mechanism for recording images on the roll paper with a thermal head, and a cutter mechanism for cutting the roll paper at a specific position. The print unit 19 conveys the roll paper by the conveyance mechanism, records receipt images on the roll paper with the recording mechanism, and cuts the roll paper with the cutter mechanism to produce a receipt as controlled by the processing device controller 12.

The print unit 19 has multiple serial interfaces for serially connecting to external devices, and a customer display 28 and cash drawer 29 are connected to these serial interfaces. The print unit 19 passes control signals output from the processing device controller 12 to the serial interfaces. The customer display 28 and cash drawer 29 are therefore connected in a daisy chain to the processing device controller 12 through the print unit 19.

The customer display 28 displays text, symbols, and images, for example, based on control signals input from the print unit 19. The cash drawer 29 is configured identically to cash drawer 49, and unlocks and opens the tray according to a drawer kick signal input from the print unit 19. When the print unit 19 passes control signals output by the processing device controller 12, the customer display 28 and cash drawer 29 operate according to the received control signals.

The processing device controller 12 comprises a CPU, ROM, RAM, and other peripheral circuits, and the CPU runs a program to control parts of the data processing device 11. The browser execution unit 12a (the browser executor 12a), device controller 12b, printer controller 12c, application execution unit 12d (application executor 12d), and data controller 12e are functions of software instantiated by the CPU of the processing device controller 12 running a program.

The browser execution unit 12a runs a browser program stored by the auxiliary storage unit 20, data storage unit 23, or other storage unit not shown. The browser execution unit 12a reads and runs an HTML file through a web browser, and generates and outputs to the device controller 12b display data for displaying on screen. When the executed HTML file contains a script, the browser execution unit 12a also runs the script. When running a script to print a receipt, the browser execution unit 12a also outputs the text data and image data to print to the printer controller 12c.

The device controller 12b detects connection of a monitor 26 and barcode scanner 27 that connect to the device connection unit 18, and connection of the customer display 28 and cash drawer 29 that connect to the print unit 19. The device controller 12b converts display data output by the browser execution unit 12a to display signals compatible with the monitor 26 and outputs to the device connection unit 18, or outputs data to the device connection unit 18 for conversion to display signals. When the device connection unit 18 outputs PLU data, the device controller 12b acquires and outputs the PLU data to the browser execution unit 12a.

Based on the text data and image data output by the browser execution unit 12a, the printer controller 12c controls the print unit 19 to print a receipt.

The browser execution unit 12a runs a web application based on the HTML file 63, and executes a transaction process at the POS in the same way as the browser execution unit 33 of the POS device 30.

The processing device controller 12 executes the operation of the browser execution unit 33 shown in column (A) of FIG. 3. The browser execution unit 12a requests the server 50 to send the HTML file 63 based on the previously set access data (step S11), downloads and runs the HTML file 63 sent by the server 50 (step S12), and runs a web application.

The operator of the POS device 10 uses the barcode scanner 27 to read the barcode of the product to be purchased (step S13), the device connection unit 18 gets the read result (step S14), and generates and outputs PLU data to the browser execution unit 12a. The browser execution unit 12a then sends the PLU data to the server 50 (step S15).

When the server 50 sends the price data corresponding to the PLU data the browser execution unit 12a sent, the browser execution unit 12a receives the price data (step S16), and executes a transaction process based on the received price data (step S17).

In this step the browser execution unit 12a displays the product name, price, and product category, for example, corresponding to the PLU data read by the barcode scanner 27 on the monitor 26. When product quantity and payment amount information are input by reading a barcode with the barcode scanner 27 or operation of an input device not shown, the browser execution unit 12a acquires the input data. The browser execution unit 12a calculates the transaction total by a function of a web application based on the input data, and displays the total amount and the payment received on the monitor 26. The browser execution unit 12a also sends a command to open the cash drawer 29 as required.

The browser execution unit 12a outputs a command to produce a receipt, text data, and image data to the print unit 19, and produces a receipt (step S18). When the browser execution unit 12a determines that one transaction process was completed, it sends the process result (process information) indicating the result of the transaction process to the server 50 (step S19). The browser execution unit 12a may send the process results for multiple transaction processes to the server 50 in a single batch.

While the browser execution unit 12a executes the operations of steps S11 to S19, the application execution unit 52 executes the operation shown in column (B) of FIG. 3 in the same way as when the POS device 30 runs the web application.

The POS device 10 thus executes a transaction process at the POS according to operator commands and the result of the transaction process of the POS device 10 is reflected in the server-side sales data 66 in the same way as with the POS device 30.

Figure 4A:
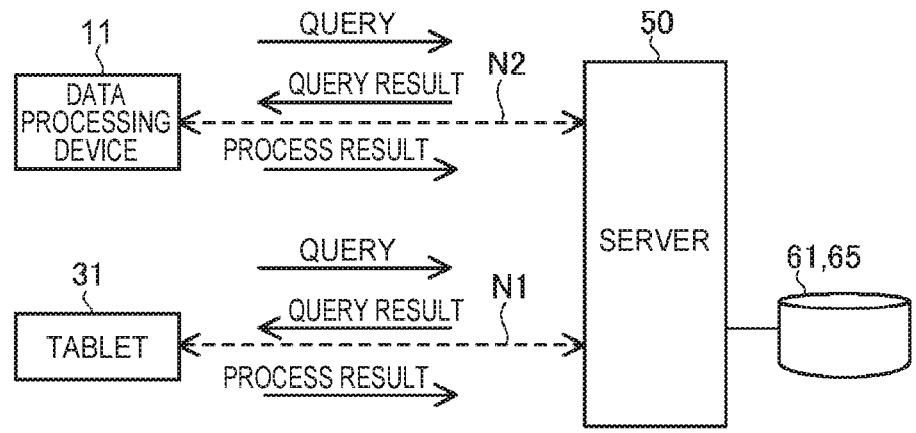
FIGS. 4A-4C describe the operations of the data processing system when sending and receiving data.
Figure 4B:
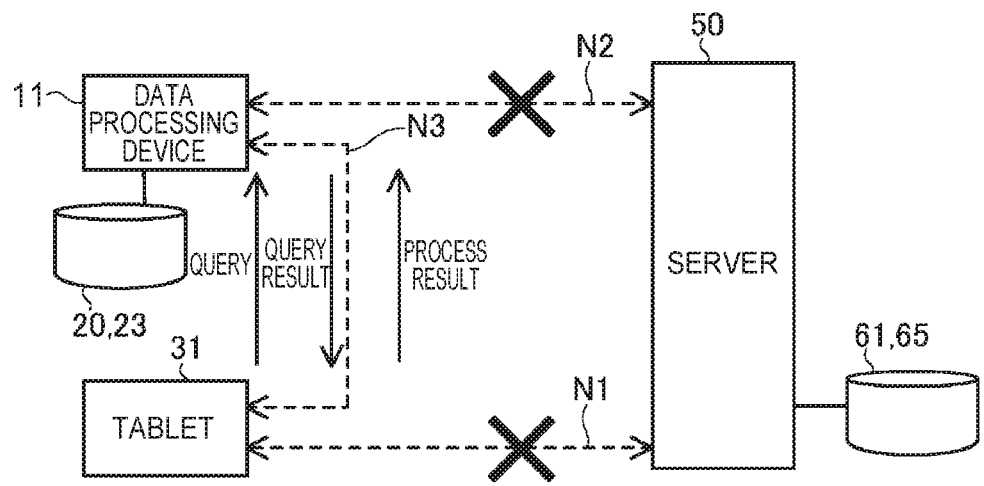
Figure 4C:
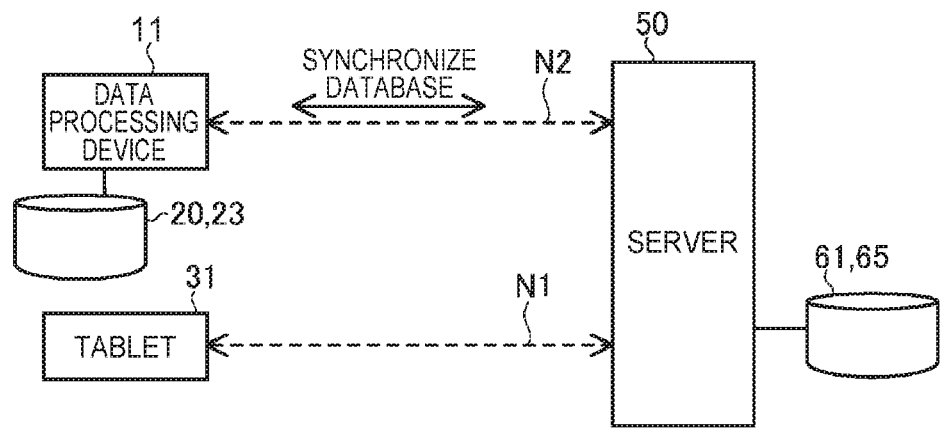

FIGS. 4A-4C illustrate the data communication operations of the data processing system 1, FIG. 4A showing normal operation, FIG. 4B showing the communication line fault isolation operation, and (C) showing the recovery operation from a communication line fault.

FIG. 4A illustrates operation when the POS device 10 and server 50, and the POS device 30 and server 50, are communicating and executing POS functions. The tablet 31 communicates through the terminal communication path N1 with the server 50. The tablet 31 makes a query based on the PLU data over the terminal communication path N1, the server 50 sends the result of the query (price data), and the tablet 31 sends the process result. In addition, the data processing device 11 communicates with the server 50 over the server communication path N2 and makes a query based on the PLU data, the server 50 sends the result of the query (price data), and the data processing device 11 sends the process result. Based on the process results sent by the data processing device 11 and tablet 31, the server 50 updates the server-side sales data 66 of the database 65.

The browser execution unit 33 evaluates the communication status of the terminal communication path N1. The tablet 31 stores the terminal communication condition, which is the condition for evaluating the communication status of the terminal communication path N1, in the tablet memory unit 36. The browser execution unit 33 detects the communication status of the terminal communication path N1, and evaluates the communication status based on whether or not the detected communication status satisfies the terminal communication condition. If the communication status of the terminal communication path N1 satisfies the terminal communication condition, the browser execution unit 33 determines communication is possible over the terminal communication path N1. If the communication status of the terminal communication path N1 does not satisfy the terminal communication condition, the browser execution unit 33 determines communication is not possible over the terminal communication path N1.

The browser execution unit 12a evaluates the communication status of the server communication path N2. The data processing device 11 stores the server communication condition, which is the condition for evaluating the communication status of the server communication path N2, in the auxiliary storage unit 20 or data storage unit 23. The browser execution unit 12a detects the communication status of the server communication path N2, and evaluates the communication status based on whether or not the detected communication status satisfies the server communication condition. If the communication status of the server communication path N2 satisfies the server communication condition, the browser execution unit 33 determines communication is possible over the server communication path N2. If the communication status of the server communication path N2 does not satisfy the server communication condition, the browser execution unit 33 determines communication is not possible over the server communication path N2.

As shown in FIG. 4B, when it is determined that communication on the terminal communication path N1 is disabled, the tablet 31 switches its connection from the server 50 to the data processing device 11. Information (such as the network address) specifying the new connection address when the connection is changed is contained in the HTML file 63 the server 50 sends to the tablet 31. The HTML file 63 may also contain terminal communication conditions. After the browser execution unit 33 evaluates the communication status of the terminal communication path N1, the browser execution unit 33 changes the connection based on the setting contained in the HTML file 63.

The tablet 31 communicates with the data processing device 11 through the process communication path N3. The tablet 31 outputs a query based on the PLU data over the process communication path N3, and the data processing device 11 returns the query result (price data) in the same way as the server 50. When the tablet 31 sends the process result, the data processing device 11 updates the database based on the process result the tablet 31 sent.

The data processing device 11 has an application execution unit 12d, data controller 12e, auxiliary storage unit 20, and data storage unit 23 to perform this operation.

The application execution unit 12d provides the same function as the application execution unit 52 (FIG. 1) based on data stored in the auxiliary storage unit 20 and data storage unit 23.

The auxiliary storage unit 20 stores the POS application 21 and HTML file 22. The POS application 21 (processing device-side software) is an application that can be used as a substitute for the POS application 62 stored by the data storage unit 61. The HTML file 22 is a file that can be used as a substitute for the HTML file 63 stored by the data storage unit 61. The application execution unit 12d drives a web application by executing the POS application 21.

The data storage unit 23 stores processor-side sales data 24 and processor-side master data 25. The processor-side sales data 24 contains data of the same content as the server-side sales data 66, and the processor-side master data 25 contains data of the same content as the server-side master data 67.

When the POS device 30 requests an HTML file, the application execution unit 12d reads and sends the HTML file 22 from the auxiliary storage unit 20 to the POS device 30. This operation corresponds to steps S21 to S22 in column (B) of FIG. 3.

The application execution unit 12d also receives the PLU data the tablet 31 sends (step S23), and references the processor-side master data 25 based on the received PLU data (step S24). The application execution unit 12d extracts the price data corresponding to the received PLU data from the processor-side master data 25, and sends the price data to the POS device 30 (step S25).

The application execution unit 12d receives the process result sent by the POS device 30 (step S26), registers the received process result in the processor-side sales data 24, and updates the processor-side sales data 24 (step S27).

The POS application 21 and HTML file 22 may be identical to the POS application 62 and HTML file 63, or may differ in part. The application execution unit 12d must simply execute a web application similarly to the application execution unit 52, and the configuration data related to executing scripts contained in HTML file 22 may differ from HTML file 63, for example.

The processor-side master data 25 and server-side master data 67 may be the same data or may differ in part. The price data acquired by the application execution unit 52 referencing the server-side master data 67 based on the PLU data, and the price data acquired by the browser execution unit 12a referencing the processor-side master data 25, must simply match. The processor-side sales data 24 and the server-side sales data 66 also must contain the same data based on the same process result, but the data structures may differ, for example.

In the simplest example, the POS application 21 and the POS application 62 are identical, and the HTML file 22 and the HTML file 63 are identical. In addition, the processor-side sales data 24 and the server-side sales data 66 are identical, and the processor-side master data 25 and the server-side master data 67 are identical.

As shown in FIG. 4B, when the browser execution unit 12a determines communication is not possible over the server communication path N2, the browser execution unit 12a accesses the application execution unit 12d and runs the web application. Information specifying the application execution unit 12d as the access address when communication over the server communication path N2 is disabled may be included in the HTML file 63, or stored in the auxiliary storage unit 20 or data storage unit 23. The HTML file 63 may also contain the server communication conditions.

The application execution unit 12d passes the HTML file 22 to the browser execution unit 12a in response to the request from the browser execution unit 12a, runs the web application, acquires the PLU data the browser execution unit 12a output, and outputs price data. In this case, the browser execution unit 12a executes the operation in column (A) of FIG. 3, and the application execution unit 12d executes the operation in column (B) of FIG. 3.

The browser execution unit 12a and application execution unit 12d pass data therebetween in the data processing device 11 in this case. Function at the POS can therefore be maintained even if the server communication path N2 cannot be used for communication.

If communication over the terminal communication path N1 is determined not possible while the browser execution unit 33 is executing the transaction process or after downloading the HTML file 63 from the server 50, downloading the HTML file 22 can be omitted. In this case, the browser execution unit 33 operates using the HTML file 63 that was already downloaded. The browser execution unit 12a does the same if communication over the server communication path N2 is determined not possible while executing the transaction process or after downloading the HTML file 63.

FIG. 4B illustrates operation when communication is not possible over either the terminal communication path N1 or server communication path N2, but also applies to when communication is not possible over only one of terminal communication path N1 and server communication path N2. When the tablet 31 determines communication over terminal communication path N1 is not possible, the tablet 31 accesses the processing device controller 12 and starts data communication through the process communication path N3 regardless of the communication status of the server communication path N2. When the browser execution unit 12a determines communication over the server communication path N2 is not possible, the browser execution unit 12a accesses the application execution unit 12d and starts the process described above regardless of the status of the terminal communication path N1.

When the data processing system 1 executes the fault isolation operation of FIG. 4B, the process result from at least one of the data processing device 11 and tablet 31 is registered in the processor-side sales data 24. As a result, process results during the fault isolation operation in FIG. 4B are not registered (reflected) in the server-side sales data 66 of the database 65. In other words, a mismatch between the processor-side sales data 24 and the server-side sales data 66 results.

The data processing system 1 therefore executes the recovery operation in FIG. 4C when the terminal communication path N1 or the server communication path N2 that was determined to be unable to carry communications changes to a communication-enabled state (recovers). In this recovery operation, the data processing device 11 and server 50 communicate to synchronize the processor-side sales data 24 and server-side sales data 66. As a result, the process results of the data processing device 11 and tablet 31 during the fault isolation operation are registered in the server-side sales data 66.

Figure 5:
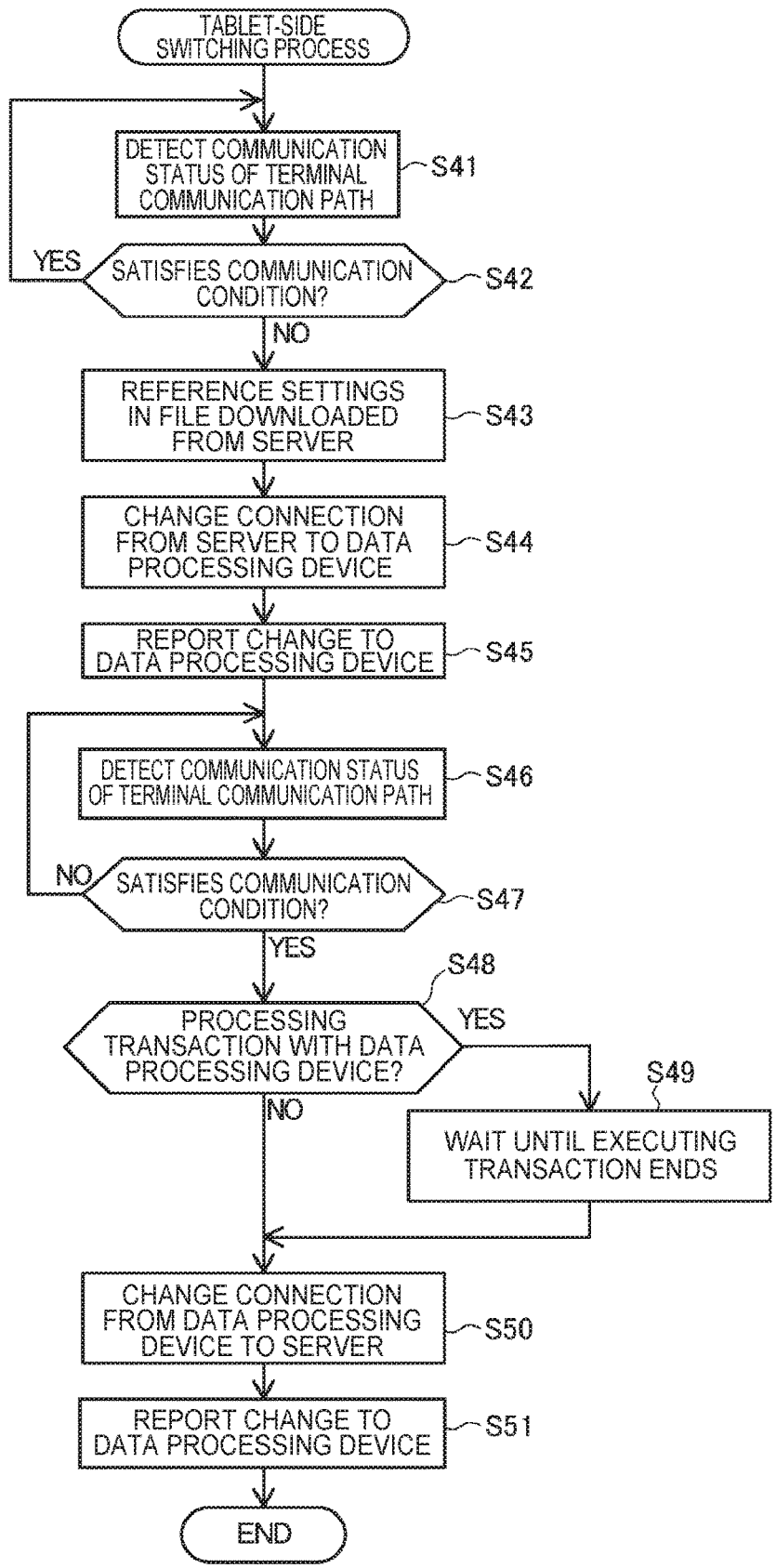
FIG. 5 is a flow chart of the tablet-side switching process executed by the tablet.

FIG. 5 is a flow chart of the tablet-side switching process executed by the tablet 31.

The browser execution unit 33 detects the communication status of the terminal communication path N1 (step S41), and determines if the terminal communication condition is met (step S42). The timing of step S41 is not specifically limited, and may be while communicating with the server 50 over the terminal communication path N1, or while running the transaction process. Step S41 may also be executed at a set time interval when not communicating with the server 50.

If the communication status of the terminal communication path N1 meets the terminal communication condition (step S42; Yes), the browser execution unit 33 repeats step S41. If the communication status of the terminal communication path N1 does not meet the terminal communication condition (step S42; No), the browser execution unit 33 references the settings in the HTML file 63 and acquires information related to the address to which to change the connection (step S43). Based on the acquired information, the browser execution unit 33 changes the connection to the data processing device 11 (step S44), and reports the change to the data processing device 11 (step S45). The report of step S45 is, for example, a request to access the application execution unit 12d of the data processing device 11. By changing the connection in step S44, the browser execution unit 33 can execute the operation of FIG. 4B.

The browser execution unit 33 then detects the communication status of the terminal communication path N1 during the fault isolation operation (step S46), and determines whether or not the terminal communication condition is met (step S47). If the communication status of the terminal communication path N1 does not meet the terminal communication condition (step S47; No), the browser execution unit 33 repeats step S46.

If the communication status of the terminal communication path N1 meets the terminal communication condition (step S47; Yes), that is, if the communication status of the terminal communication path N1 changed (recovered) to a state enabling communication, the browser execution unit 33 executes an operation to change the connection again. The browser execution unit 33 first determines if a transaction is being processed with the data processing device 11 (step S48). This transaction is a unit of a process involving sending and receiving data that should not be interrupted, and in this example refers to a process related to registering a process result in the server-side sales data 66 or processor-side sales data 24. More specifically, one transaction process is one transaction.

If a transaction is executing (step S48; Yes), the browser execution unit 33 waits until the transaction in progress ends (step S49). More specifically, it waits until sending the process result. Next, the browser execution unit 33 changes the connection from the data processing device 11 to the server 50 (step S50), and then reports to the data processing device 11 that the connection changed to the server (step S51). If a transaction is not in progress (step S48; No), the browser execution unit 33 goes to step S50.

Figure 6:
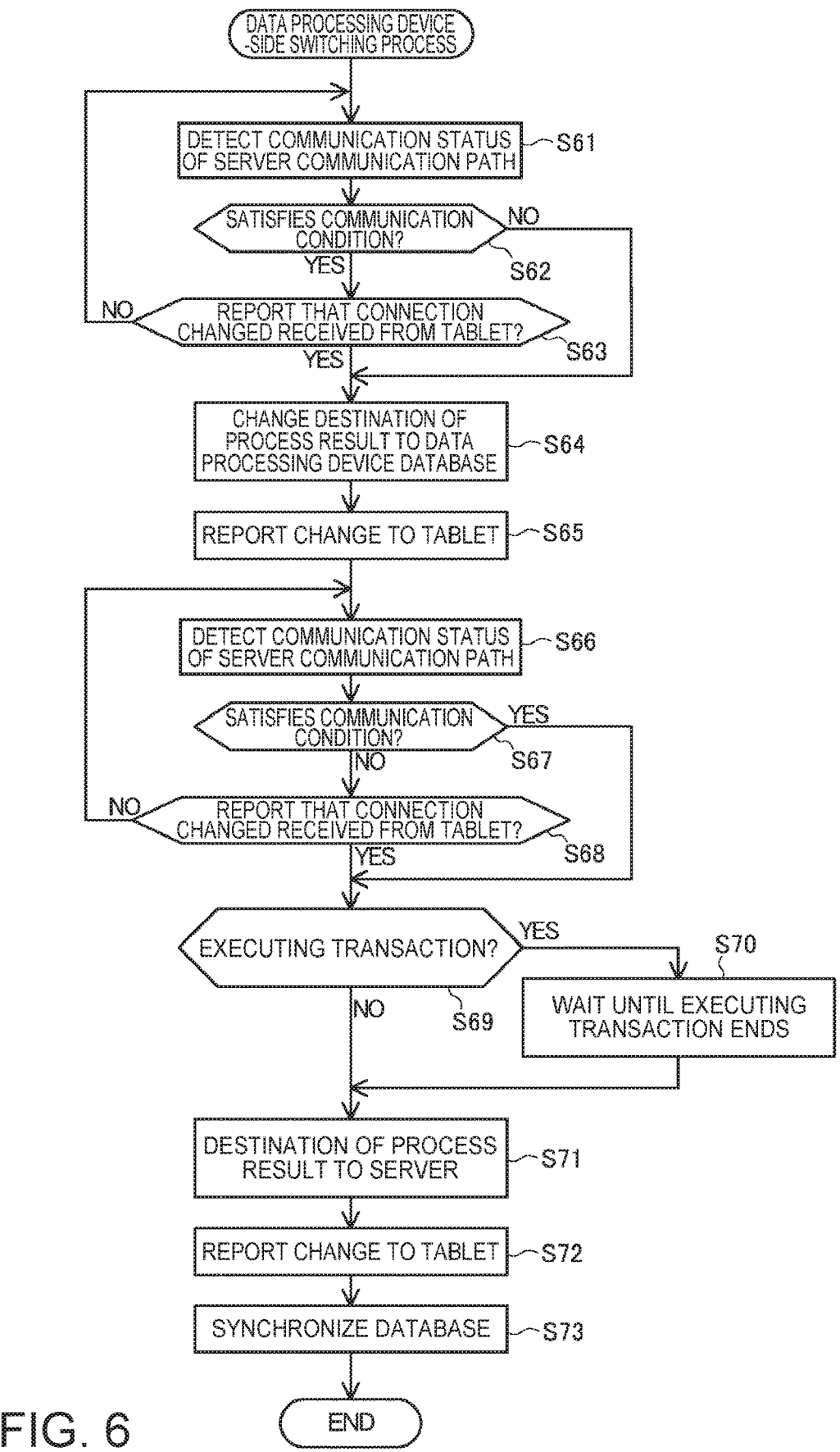
FIG. 6 is a flowchart of the data processing device-side switching process executed by the data processing device.

FIG. 6 is a flowchart of the data processing device-side switching process executed by the data processing device 11. In the process of FIG. 6, the data processing device 11 executes both a process of changing the connection appropriately to the communication status of the server communication path N2, and a process appropriate to the report from the tablet 31.

The browser execution unit 12a of the data processing device 11 detects the communication status of the server communication path N2 (step S61), and determines if the server communication condition is met (step S62). The timing of step S61 is not specifically limited, and may be while communicating with the server 50 over the server communication path N2, or while running the transaction process. Step S61 may also be executed at a set time interval when not communicating with the server 50.

If the communication status of the server communication path N2 meets the server communication condition (step S62; Yes), the browser execution unit 12a determines if a report of changing the connection was received from the tablet 31 (step S63). If a report was not received (step S63; No), the browser execution unit 12a repeats step S61.

If the communication status of the server communication path N2 does not meet the server communication condition (step S62; No), and a report of a changed connection was received from the tablet 31 (step S63; Yes), the browser execution unit 12a changes the connection. In other words, the browser execution unit 12a changes the address to which the process result is output to the processor-side sales data 24 controlled by the application execution unit 12d (step S64), and reports the change to the tablet 31 (step S65). In steps S62 to S64, the connection changes to the application execution unit 12d when communication over the terminal communication path N1 is not possible even if communication over the server communication path N2 is possible. This is to prevent the processor-side sales data 24 and server-side sales data 66 from being updated to different content. Step S63 and step S68 described below may be omitted if a process for reconciling differences between the processor-side sales data 24 and server-side sales data 66 is possible.

The browser execution unit 12a detects the communication status of the server communication path N2 during the fault isolation process (step S66), and determines if the server communication condition is met (step S67). If the communication status of the server communication path N2 does not meet the server communication condition (step S67; No), the browser execution unit 12a determines if there was a report of a connection change from the tablet 31 (step S68). If a report was not received (step S68; No), the browser execution unit 12a repeats step S66.

If the communication status of the server communication path N2 meets the server communication condition (step S67; Yes), that is, if the communication status of the server communication path N2 changed (recovered) to a state enabling communication, and if there was a report from the tablet 31 (step S68; Yes), the browser execution unit 12a changes the connection again. First, the browser execution unit 12a determines if the browser execution unit 12a and application execution unit 12d are processing a transaction (step S69). Both transactions executed by the application execution unit 12d in response to requests from the tablet 31, and transactions the browser execution unit 12a executes with the application execution unit 12d, are evaluated in step S69. If either transaction is in progress (step S69; Yes), the browser execution unit 12a waits until the transaction in progress ends (step S70).

The browser execution unit 12a then changes the connection to the server 50 (step S71), and reports to the tablet 31 that the connection changed to the server (step S72). If a transaction is not in progress (step S69; No), the browser execution unit 12a goes to step S71.

After changing the connection to the server 50, the data controller 12e executes a database synchronization process (step S73). In step S73, the data controller 12e and the database controller 53 exchange data and synchronize the processor-side sales data 24 and server-side sales data 66. For example, the data controller 12e acquires the update history, update time, last update time, updated data, data size, and other information about the processor-side sales data 24. The database controller 53 likewise acquires the update history, update time, last update time, updated data, data size, and other information about the server-side sales data 66. By exchanging the acquired information, the data controller 12e and database controller 53 then extract the differences between the processor-side sales data 24 and server-side sales data 66. By reflecting this difference data in the processor-side sales data 24 and server-side sales data 66, the data can be synchronized.

In step S73, the data controller 12e may communicate with the database controller 53 and update the processor-side master data 25 based on the server-side master data 67, and may update the POS application 21 based on the POS application 62. The HTML file 22 may also be updated based on the HTML file 63. This process can synchronize the software and data stored by the data processing device 11, and the software and data stored by the server 50. For example, when the server 50 updates or modifies the software or data stored by the data storage unit 61 and database 65, the content of the updates or changes can be reflected in the software and data stored by the data processing device 11.

As described above, a data processing system 1 according to this embodiment of the invention includes a server 50 that stores a POS application 62 and an HTML file 63; a data processing device 11 that stores a POS application 21 and an HTML file 22; and a tablet 31 that connects to the server 50 through a terminal communication path N1 and executes the POS application 62 and HTML file 63 through a web browser when the terminal communication path N1 satisfies a defined terminal communication condition, and when the terminal communication path N1 does not satisfy the terminal communication condition, connects to the data processing device 11 through a process communication path N3 based on information indicated by the POS application 62 and HTML file 63. As a result, when communication is not possible because the terminal communication path N1 does not meet the communication condition, the tablet 31 connects to the data processing device 11 and can continue processing transactions as a POS terminal In this event, the tablet 31 may run the POS application 21 and HTML file 22 through a web browser. When connected to the data processing device 11, the tablet 31 may also execute the POS application 62 and HTML file 63 through a web browser. The server 50 may also store server-side sales data 66 and server-side master data 67. The data processing device 11 may also store processor-side sales data 24 and processor-side master data 25.

If the terminal communication path N1 satisfies the terminal communication condition while connected to the data processing device 11 and executing one process through the process communication path N3, the tablet 31 changes the connection to the terminal communication path N1 when the one process that is executing ends. As a result, when the communication status of the terminal communication path N1 is restored to a state meeting the condition, the tablet 31 can change the connection and connect to the server 50 without adversely affecting the transaction that is in progress. As a result, because the connection changes to the server 50 after the process result is recorded in the processor-side sales data 24, a loss of data synchronization can be prevented.

When the terminal communication path N1 meets the terminal communication condition, the tablet 31 connects to the server 50 through the terminal communication path N1, runs processes based on the server-side master data 67, and sends process results related to the executed process to the server 50. As a result, the results of processes the tablet 31 executed when connected to the data processing device 11 can be registered in the server-side master data 67 of the server 50.

When the terminal communication path N1 does not meet the terminal communication condition, the tablet 31 connects through the process communication path N3 to the data processing device 11, runs processes based on the processor-side master data 25, and sends process results related to the executed process to the data processing device 11. As a result, when communication is not possible because the communication status of the terminal communication path N1 does meet the condition, the tablet 31 can continue processing based on data provided by the data processing device 11, and can save the results of the executed processes in the data processing device 11.

Furthermore, when the server communication path N2 meets a defined server communication condition, the data processing device 11 updates the processor-side sales data 24 based on the server-side sales data 66. As a result, the data and software stored by the data processing device 11, and the data and software stored by the server 50, can be kept synchronized.

The data processing device 11 may update the processor-side master data 25 based on the server-side master data 67, and may update the POS application 21 based on the POS application 62. The HTML file 22 may also be updated based on the HTML file 63.

When the server communication path N2 meets the specified server communication condition, the data processing device 11 sends the process result from the tablet 31 to the server 50. As a result, the results of processes the tablet 31 executed while unable to communicate over the terminal communication path N1 can be sent to the server 50.

The data processing device 11 may also have a data storage unit 23, and when the server communication path N2 does not meet the specified server communication condition, stores process results from the tablet 31 in the processor-side sales data 24 of the data storage unit 23 and updates the processor-side master data 25 stored in the data storage unit 23 based on the processor-side sales data 24. As a result, the data stored by the data processing device 11 can be updated based on the results of processes executed by the tablet 31 when communication over the terminal communication path N1 is not possible.

When the server communication path N2 meets the server communication condition, the data processing device 11 connects to the server 50 through the server communication path N2, executes processes based on the server-side master data 67, and sends process results related to the executed processes to the server 50. As a result, the results of processes executed by the tablet 31 based on data stored by the server 50 can be reflected in the server-side sales data 66.

When the server communication path N2 does not meet the server communication condition, the data processing device 11 executes processes based on the processor-side master data 25 and saves process results related to the executed processes in the data storage unit 23. As a result, the data processing device 11 can execute processes based on data stored by the data processing device 11 when unable to communicate over the server communication path N2, and can store the results of the executed processes in the data processing device 11.

When the server communication path N2 changes from a state not satisfying the server communication condition to the state satisfying the server communication condition, the data processing device 11 sends the process results stored in a process result storage unit (a process result storage) to the server 50. As a result, when the server communication path N2 returns to a state enabling communication, the results of processes executed by the tablet 31 or data processing device 11 can be sent to the server 50.

The data processing device 11 also has an auxiliary storage unit 20 that stores the POS application 21 and HTML file 22; connects to the server 50 through the server communication path N2 and executes the POS application 62 and HTML file 63 when the server communication path N2 meets the server communication condition; and executes the POS application 21 and HTML file 22 stored by the auxiliary storage unit 20 when the server communication path N2 does not satisfy the server communication condition. The data processing device 11 can therefore execute processes regardless of the communication status of the server communication path N2.

The invention is described above with reference to a preferred embodiment thereof, but the invention is not limited thereto and can be modified and adapted in many ways without departing from the scope of the accompanying claims. For example, the devices that connect to the data processing device 11 and recording device 41 of the embodiment are not limited to the examples shown in FIG. 1, and a card reader for reading magnetic stripe cards or IC cards may be connected. The printing method of the print unit 19, 45 in the foregoing embodiment is a thermal printing method. However, the printing method is not limited to thermal methods. The communication network N, terminal communication path N1, server communication path N2, process communication path N3, and wireless communication link N4 may also be desirably configured, and the communication protocols used are not limited. The function blocks shown in FIG. 1 and FIG. 2 can also be desirably embodied by hardware and software, and do not suggest a particular hardware configuration.

As described above, the invention is useful in systems in which a terminal device communicates with a server to process data, and is particularly suited to the terminal device processing data even when a communication fault occurs.

REFERENCE SIGNS LIST

1 data processing system
5 communication device
10 POS device
11 data processing device
12 processing device controller
12*a* browser execution unit
12*b* device controller
12*c* printer controller
12*d* application execution unit
12*e* data controller
17 processing device communication unit
18 device connection unit
20 auxiliary storage unit (software storage unit)
21 POS application (processing device-side software)
22 HTML file
23 data storage unit (process information storage unit)
24 processor-side sales data
25 data processing device-side master data
30 POS device
31 tablet (terminal device)
32 tablet controller
33 browser execution unit
34 tablet communication unit
41 recording device
42 recording device controller
43 recording device communication unit
44 device connection unit
50 server
51 server controller
52 application execution unit
53 database controller
55 server communication unit
61 data storage unit
62 POS application (server-side software)
63 HTML file
63 file
65 database
66 server-side sales data
67 server-side master data
N communication network
N1 terminal communication path
N2 server communication path
N3 process communication path

The invention claimed is:

1. A data processing system comprising:
    a server configured to store server-side master data and a server-side markup language file, the server-side markup language file including a script configured to call one or more functions, the one or more functions comprising determining a price of a product based on an identifier of the product;
    a printer configured to act as a server, store printer-side master data and a printer-side markup language file, the printer-side markup language file including a script configured to also call the one or more functions; and
    a point-of-sales terminal device configured to:
        when a terminal communication path satisfies a previously set terminal communication condition, connect to the server through the terminal communication path, download the server-side markup language file, and execute the server-side markup language file through a web browser operating at the point-of-sales terminal device, and
        when the terminal communication path does not satisfy the terminal communication condition, after connecting the printer through a printer communication path, receive the printer-side markup language file from the printer, and execute the printer-side markup language file through the web browser,
        such that the point-of-sales terminal device determines, by the one or more functions, the price of the product based on the identifier of the product for printing a receipt for the product, regardless of whether the terminal communication path satisfies the terminal communication condition.

2. The data processing system described in claim 1, wherein:
    if the terminal communication path satisfies the terminal communication condition while the point-of-sales terminal device is connected to the printer and executing one process, the point-of-sales terminal device changes the connection to the terminal communication path when executing the one process in progress ends.

3. The data processing system described in claim 1, wherein:
    when the terminal communication path satisfies the terminal communication condition, the point-of-sales terminal device connects to the server through the terminal communication path, executes a process based on the server-side master data, and sends process information related to the executed process to the server.

4. The data processing system described in claim 3, wherein:
    when the terminal communication path does not satisfy the terminal communication condition, the point-of-sales terminal device connects to the printer through the printer communication path, executes a process based on the printer-side master data, and sends process information related to the executed process to the printer.

5. The data processing system described in claim 1, wherein:
    the printer is connected to the server through a server communication path, and
    when the server communication path satisfies a previously set server communication condition, the printer updates at least one of the printer-side master data and the printer-side markup language file based on at least one of the server-side master data and the server-side markup language file.

6. The data processing system described in claim 4, wherein:
    the printer is connected to the server through a server communication path, and when the server communication path satisfies a previously set server communication condition, the printer sends the process information from the point-of-sales terminal device to the server.

7. The data processing system described in claim 6, wherein:
the printer has a process information storage, and when the server communication path does not satisfy the server communication condition, stores the process information from the point-of-sales terminal device in the process information storage, and updates the printer-side master data based on the process information stored in the process information storage.

8. The data processing system described in claim 7, wherein:
when the server communication path satisfies the server communication condition, the printer connects to the server, executes a process based on the server-side master data, and sends process information related to the executed process to the server, through the server communication path.

9. The data processing system described in claim 7, wherein:
the printer has a data storage configured to store the printer-side master data, and
when the server communication path does not satisfy the server communication condition, executes the process based on the printer-side master data in the data storage, and stores the process information related to the executed process in the process information storage.

10. The data processing system described in claim 7, wherein:
when the server communication path changes from a state not satisfying the server communication condition to a state satisfying the server communication condition, the printer sends the process information stored in the process information storage to the server.

11. The data processing system described in claim 5, wherein:
the printer has a storage configured to store the printer-side markup language file,
connects to the server and executes the server-side markup language file through the server communication path when the server communication path satisfies the server communication condition, and
when the server communication path does not satisfy the server communication condition, executes the printer-side markup language file from the storage.

12. A data processing method for processing data between a point-of-sales terminal device, a printer, and a server, the data processing method comprising:
when a terminal communication path satisfies a previously set terminal communication condition:
connecting the point-of-sales terminal device to the server through the terminal communication path;
executing by the point-of-sales terminal device a server-side markup language file of the server through a web browser, the server-side markup language file including a script configured to call one or more functions, the one or more functions comprising determining a price of a product based on an identifier of the product;
when the terminal communication path does not satisfy the terminal communication condition:
connecting the point-of-sales terminal device to the printer through a printer communication path;
sending by the printer to the point-of-sales terminal device a printer-side markup language file as a server when the printer is connected to the point-of-sales terminal device, the printer-side markup language file including a script configured to also call the one or more functions;
executing by the point-of-sales terminal device the printer-side markup language file of the printer through the web browser when the point-of-sales terminal device receives the printer-side markup language file from the printer;
determining, by the point-of-sales terminal device, the price of the product based on the identifier of the product when the point-of-sales terminal device executes the script regardless of whether the terminal communication path satisfies the terminal communication condition;
sending, by the point-of-sales terminal device, a request to the printer to print a receipt for the product; and
printing, by the printer, a receipt in response to receiving the request from the point-of-sales terminal device.

13. The data processing method described in claim 12, wherein:
if the terminal communication path satisfies the terminal communication condition while the point-of-sales terminal device is connected to the printer and executing one process, the point-of-sales terminal device changes the connection to the terminal communication path when executing the one process in progress ends.

14. The data processing method described in claim 13, wherein:
when the terminal communication path satisfies the terminal communication condition, the point-of-sales terminal device connects to the server through the terminal communication path, executes a process based on server-side master data, and sends process information related to the executed process to the server, the server-side master data being stored at the server.

15. The data processing method described in claim 14, further comprising:
connecting to the printer through the printer communication path, executing a process based on printer-side master data, and sending process information related to the executed process to the printer, when the terminal communication path does not satisfy the terminal communication condition, the printer-side master data being stored at the printer.

16. A printer connectable to a server and a point-of-sales terminal device, the printer comprising:
a printer storage configured to store printer-side master data and a printer-side markup language file, the printer-side markup language file including a script configured to call one or more functions, the one or more functions including a receipt printing function;
the printer configured to:
act as a server;
connect to the point-of-sales terminal device through a printer communication path at least when a terminal communication path connecting the point-of-sales terminal device to the server does not satisfy a previously set terminal communication condition; and
send the printer-side markup language file to the point-of-sales terminal device when the printer is connected to the point-of-sales terminal device, the printer-side markup language file being structured so as to be executable by the point-of-sales terminal device using a web browser, print a receipt in response to receiving a request from the point-of-sales terminal device to print a receipt for a product, the request being generated when the point-of-sales terminal device executes the script.

\* \* \* \* \*